B. C. SWINEHART.
VEHICLE TIRE.
APPLICATION FILED JUNE 20, 1911.
1,021,561. Patented Mar. 26, 1912.
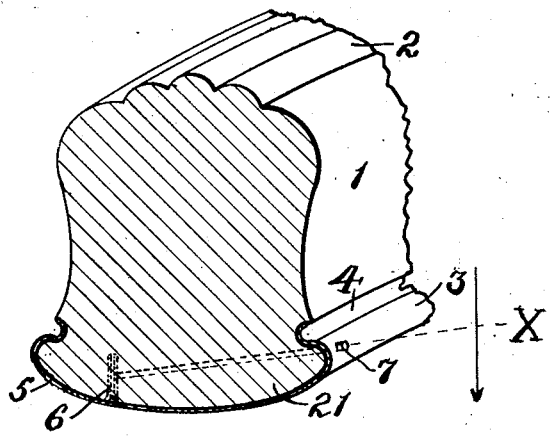
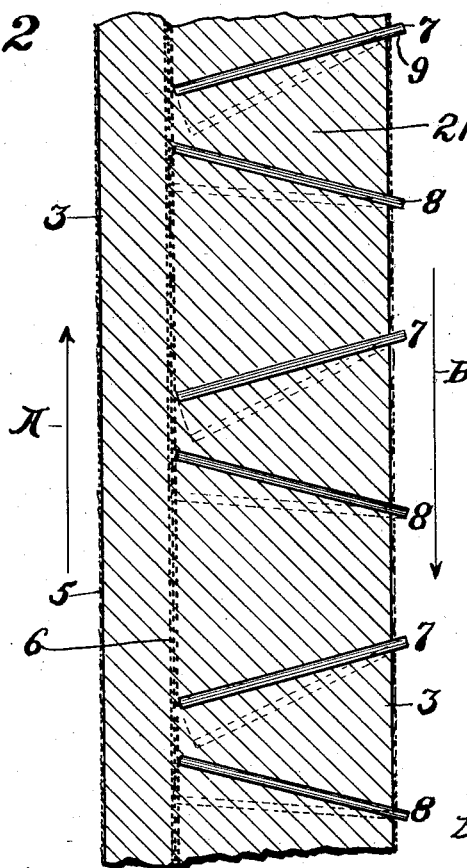
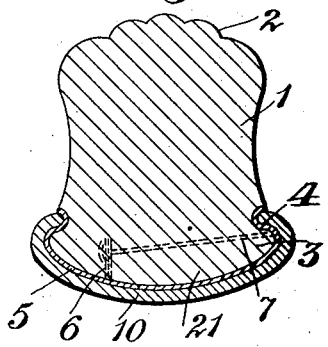
Witnesses:
A. L. McClintock
A. E. Kling
Inventor
Benjamin C. Swinehart,
by C. E. Humphrey
Atty

UNITED STATES PATENT OFFICE.

BENJAMIN CLIFFORD SWINEHART, OF YOUNGSTOWN, OHIO.

VEHICLE-TIRE.

1,021,561.  Specification of Letters Patent.  Patented Mar. 26, 1912.

Application filed June 20, 1911. Serial No. 634,372.

*To all whom it may concern:*

Be it known that I, BENJAMIN CLIFFORD SWINEHART, a citizen of the United States, residing at Youngstown, in the county of Mahoning and State of Ohio, have invented new and useful Improvements in Vehicle-Tires, of which the following is a specification.

This invention has relation to improvements in elastic vehicle tires of the solid type adapted to be mounted on a clencher rim, and the object of the invention is, primarily, to construct a tire which will not move circumferentially or creep on the rim and at the same time utilize the means employed for preventing creeping to serve as additional means for securing the base portion of the tire firmly on the rim against accidental displacement.

More specifically, the invention contemplates the provision of a solid rubber tire having a base portion adapted to seat on a clencher rim and to be there held in position by means of the well known clamping clencher flanges characteristic of this type of rim, and increase the effectiveness of the clencher flanges in holding the base of the tire against creeping and against accidental displacement, by employing a plurality of rods or bars submerged or embedded in the base of the tire and extending from one of the lateral faces of the base of the tire laterally but stopping short of the opposite side of the tire, said rods arranged at an angle with respect to the longitudinal central line of the tire.

My invention further contemplates the embedding in the base of the tire of two series of inclined rods, the members of each series preferably alternating with each other and arranged to extend laterally from the same side of the base of the tire so that all of the rods abut against one of the clencher flanges which holds the tire in position.

I accomplish the object of this invention by embedding inclined rods in the base of the tire, each rod having one end abutting against one of the clencher flanges, and with the opposite end thereof approximately free to move or float in unison with the movement of the rubber of the tire on the roadway. As the tire moves in one direction the rubber moves slightly in the opposite direction and as this movement of the tire is transmitted to the base thereof, the rods or bars of one series are moved from their inclined positions into positions more nearly approximating true transverse lines and this movement tends to cause the free or floating ends of the rods or bars to pinch or compress the rubber in the base between their free or floating ends and the opposite flange so firmly as to set up considerable frictional engagement between the compressed portion of the rubber and the flange which will tend to lock the tire more firmly in its seat to prevent creeping or displacement.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures, Figure 1, is a view in transverse section of an ordinary type of solid tire embodying my invention for preventing creeping of the same; Fig. 2, is a longitudinal sectional view of the tire shown in Fig. 1 approximately on line X thereof; and Fig. 3 is a transverse sectional view of a tire embodying this invention mounted in a flanged rim.

Referring to the drawings in detail, the numeral 1 denotes a solid tire of ordinary construction provided with a tread 2 and a base 21, the latter provided with lateral side ridges 3 outside of which are longitudinal grooves 4 to receive the inturned flanges of a clencher wheel rim 10. The base portion of the tire is further preferably covered with one or more layers of fabric 5 which extend laterally to cover the ridges and a portion of the grooves 4. The base of the tire is further provided with a longitudinally-extending slit or opening usually placed at one side of the longitudinal central line thereof and which is filled with layers of fabric 6 which may be, if desired, continuations of the layers of fabric 5 extending outwardly into this slit or opening.

Extending transversely of the base of the tire and at inclinations of approximately 15° with respect to the longitudinal central line of the tire are two series of bars or rods 7 and 8, the members of each series being approximately parallel and the members of the two series arranged at opposite inclinations with respect to each other. The members of both series of rods are arranged to project laterally from the side of one of the ridges 3 on one side of the tire extending a short distance at 9 to engage the clencher flange on that side of the tire and their opposite ends project into the tire body a sufficient distance to encounter the layers of fabric 6. These rods or bars may be of any material and the members of each series may be placed closer together than is shown in the drawings and, if desired, only one series may be employed, in which latter instance, the tire will be designed to run in one direction only. However, irrespective of whether one or two series is employed, the members of each series should extend horizontally from the outer face of one of the ridges 3 laterally to points slightly beyond the central longitudinal line of the tire and terminate at points remote from the opposite face of the ridge 3, to enable the ends of the rods or bars to float or move in the body of rubber composing the base of the tire; and experience has shown it best to cause the ends of the rods or bars to project beyond one of the ridges 3 to engage one of the clencher flanges which presses them laterally into the tire under tension at all times and causing them to lie flush with the lateral face of the ridge when the tire is seated in the rim 10.

It is well known that if a tire is moved in one direction the movement of the rubber composing the same, if any, will be in an opposite direction and this movement is transmitted from the tread to the base, that is to say, if the tire shown is moved in one direction, for instance, in the direction of the arrow A in Fig. 2 the movement of the rubber will be in the direction of the arrow B. With this clearly in view, it will be obvious that if the tire is moved in the direction of the arrow A and the rubber moves in the opposite direction, the rods or bars will be moved into the position indicated by the dotted lines. By this it will be seen that the members of the series 7 will be more inclined as the rubber moves, as shown in the dotted lines, and the bars composing the series 8 will be moved to positions more nearly approximating straight transverse lines. The movement of the bars composing the series 7 will have little or no effect upon the tire, but as the bars comprising the series 8 are moved into the positions indicated by the dotted lines in Fig. 2 the free or floating ends thereof will tend to squeeze and press the rubber existing between their free ends and the opposite clencher flange, which compression tends to produce greater frictional engagement between the particular side ridge 3 and its appropriate rim flange thereby serving to reduce creeping and to prevent accidental displacement of the tire. It will be noted that as the free or floating ends of the bars composing series 8 move in unison with the rubber their opposite ends which are in abutting engagement with the opposite clencher flange will remain approximately stationary so that the outer or free end of each rod swings, as it were, on the fixed end as a pivot. The reason for this is that the rubber along the more central portions of a tire moves more freely than do those portions which are adjacent to the flanges of the rim because the movement of the side portions of the base of the tire which are engaged by the rim flanges is retarded and consequently, as the free ends of the bars terminate in the more central portions of the tire they are permitted to move more freely and do, in fact, move a considerably greater distance than do the ends which abut one of the flanges of the rim.

The longitudinal plies of fabric 6 against which the inner or floating ends of the rods are adapted to engage are utilized for the purpose of affording a stronger tenacious abutment for the ends of the rods to prevent the latter from tearing or injuring the rubber or working their way through the base of the tire under service conditions. It will be obvious from the description of the movement of the bars composing the series 8 that if the direction of movement of the tire is reversed, a similar movement of the rods composing the series 7 will take place, during which time the bars composing the series 8 will be substantially inoperative.

I am aware that solid rubber tires having transverse wires extending across their bases have been constructed, and also that such wires have been arranged diagonally with respect to the longitudinal line of the tire, and hence, I do not claim these features, but What I do claim, and desire to secure by Letters-Patent, is:

1. An elastic tire for vehicle wheels comprising a body of elastic material having in the base thereof an embedded longitudinally-extending layer of wear-resisting material arranged remote from the lateral faces thereof and further provided with a circumferential series of diagonally-positioned cross-bars extending from one of the lateral faces of said base into the body thereof and resting against said layer, the ends of the said bars which engage said layer arranged to swing, in unison with the movement of the material of said tire, upon their opposite ends as pivots, whereby the body portions of said bars will shift from a diagonal position to a more nearly transverse one, said bars arranged when their position is shifted to compress the material of said tire existing between said layer and the rim flange on one side of the tire.

2. The combination with the tire-carrying flanged rim of a vehicle wheel, of an elastic tire adapted to be mounted thereon, a plurality of diagonally-positioned cross-bars extending from one of the lateral faces of said base and held in position by one of said flanges as an abutment, said bars terminating at points remote from the opposite side of said tire, the extended ends of said bars being free to shift on their opposite ends as pivots in unison with the movements of the material of said tire, whereby when said bars are shifted from a diagonal position to a more nearly transverse position the material existing between their movable ends and the opposite side of the tire is compressed against the rim for preventing creeping and displacement of the same.

In testimony whereof I have hereunto set my hand in presence of two subscribing witnesses.

BENJAMIN CLIFFORD SWINEHART.

Witnesses:
WALLACE DUNN,
H. S. MUSSELMAN.

Copies of this patent may be obtained for five cents each, by addressing the "Commissioner of Patents, Washington, D. C."